C. E. SMITH.
Bench-Hook.

No. 165,262.  Patented July 6, 1875.

Witnesses:
F. H. Schott.
A. E. Parker.

Inventor:
Charles E. Smith

UNITED STATES PATENT OFFICE.

CHARLES E. SMITH, OF LOWELL, MASSACHUSETTS.

IMPROVEMENT IN BENCH-HOOKS.

Specification forming part of Letters Patent No. 165,262, dated July 6, 1875; application filed January 16, 1875.

*To all whom it may concern:*

Be it known that I, CHARLES E. SMITH, of Lowell, in the county of Middlesex and State of Massachusetts, have invented certain new and useful Improvements in Bench-Hooks; and I do hereby declare that the following is a full, clear, and exact description thereof, which will enable others skilled in the art to which it pertains to make and use the same, reference being had to the accompanying drawings, and to the letters of reference marked thereon, which form a part of this specification.

This invention relates to that class of tools used in connection with the work-benches of carpenters and joiners, for the purpose of giving a firm end support to the material placed thereon while it is being planed, or for other analogous purposes, the object being to produce a tool which is readily adjusted vertically, and will remain without possibility of slip or change of the position in which it is fixed, thus avoiding the inconvenience occasioned by the slipping of the hook, which frequently occurs where they are secured by a cam or wedge alone, and if these devices are connected with a spring for raising and lowering it, the tool is rendered actually dangerous to the operator; and the invention consists in the construction, combination, and arrangement of the different parts of the device, as will be hereinafter fully set forth and then claimed.

Figure 1:
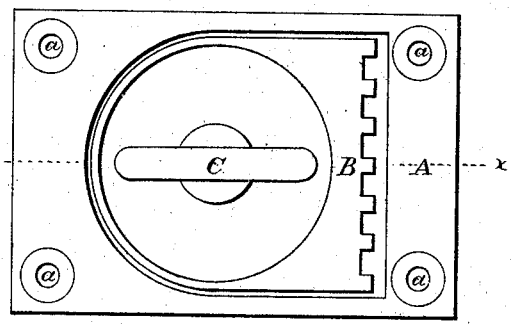
Figure 2:
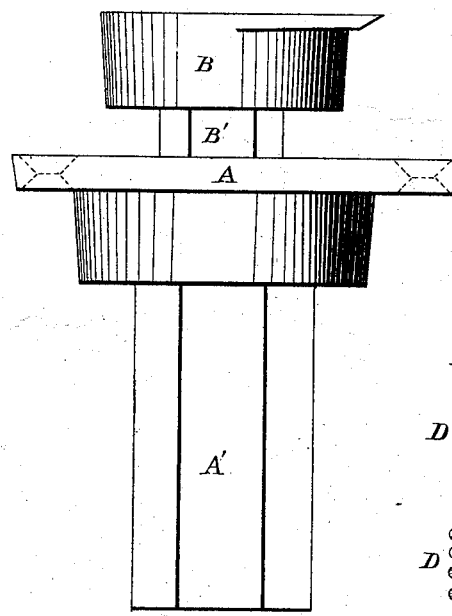
Figure 3:
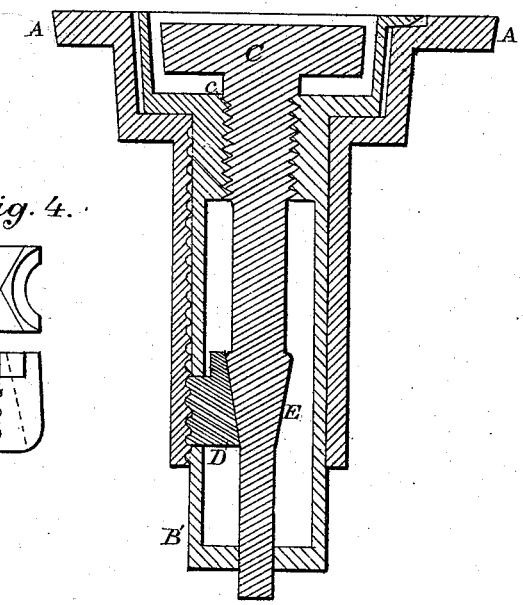
Figure 4:
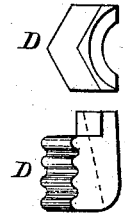

Figure 1 is a plan or top view of the implement, showing the recess within which the thumb-screw is placed, and the arrangement of the parts which appear above the bench when in use. Fig. 2 represents a side view, and exhibits the outward form of the parts which are inserted in the bench. Fig. 3 is a vertical section on the line $x\ x$ of Fig. 1, and shows the form and arrangement of the devices for adjusting the hook. Fig. 4 are views showing the form of the wedge-block.

A represents a metallic bed-plate, provided with an elongated case, A', in which are incased the operating devices fitted into the work-bench, and secured therein by screws passing through the orifices $a$, a suitable recess being formed in the same for the reception of the hook B. This hook has a tubular projection, B', which passes downward through the case A', and has formed in one of its sides a slot, through which passes the wedge-block D. This block is outwardly of conical form. The part which bears against the case A may be corrugated, if desired, so as to fit similar corrugations in the case. A thumb-screw, C, which works in a screw-thread cut into the tubular part of the hook at $c$, is provided with a spindle, which extends downward through, and has a bearing in, the lower end of the tubular extension B'. A conical wedge, E, is formed upon this spindle, and bears upon the wedge-block D, which is adjusted by means of the thumb-screw C. By turning the thumb-screw in one direction the conical wedge is brought to bear against the wedge-block D, pressing the same against the inside of the projection A' of the bed-plate A, thus securing the hook B firmly in any desired position, a reverse movement of the screw releasing the block and allowing the hook to be elevated or depressed. It will thus be seen that the hook can be easily adjusted, and without liability of its springing up and damaging the plane while at work.

Having thus described my invention, I claim as new, and desire to secure by Letters Patent of the United States, the following:

The bed-plate A, provided with the extension A', in combination with the hook B B', thumb-screw C, with its conical wedge E, and wedge-block D, substantially as and for the purpose specified.

In testimony that I claim the foregoing as my own, I hereunto affix my signature in presence of two witnesses.

CHARLES E. SMITH.

Witnesses:
EDWIN H. COOKE,
W. G. RUNDLETT.